Oct. 19, 1943.    E. R. LEATHERMAN    2,331,987
GAUGING APPARATUS
Filed Oct. 30, 1941

INVENTOR.
Earl R. Leatherman
BY Spencer Hardman and Fehr
Attorneys

Patented Oct. 19, 1943

2,331,987

UNITED STATES PATENT OFFICE 2,331,987

GAUGING APPARATUS

Earl R. Leatherman, Dayton, Ohio, assignor to General Motors Corporation, Dayton, Ohio, a corporation of Delaware Application October 30, 1941, Serial No. 417,174

4 Claims. (Cl. 33—174)

This invention relates to gauges and more particularly to extremely sensitive gauges wherein the work to be gauged is supported on a shaft.

I have found that in sensitive gauges, wherein the work is supported upon a shaft, that the gauging is considerably affected by the manner in which the operator handles the work upon the gauge shaft. It requires a highly skilled operator to obtain uniform results. In fact, there is considerable variation between the results obtained by different skilled operators. What apparently happens is that the work becomes cocked upon the shaft due to force applied eccentrically thereto.

It is an object of my invention to provide a support for work upon gauges which will provide uniform results regardless of the experience of the operator.

It is another object of my invention to provide a support for work upon the gauge which will minimize the tendency to cock the work upon the gauge shaft.

In order to attain these objects, I have provided a universal type support concentric with the gauge shaft for supporting the work in such a way that there will be no tendency to cock the work on the shaft.

Further objects and advantages of the present invention will be apparent from the following description, reference being had to the accompanying drawing, wherein a preferred form of the present invention is clearly shown.

Figure 1:
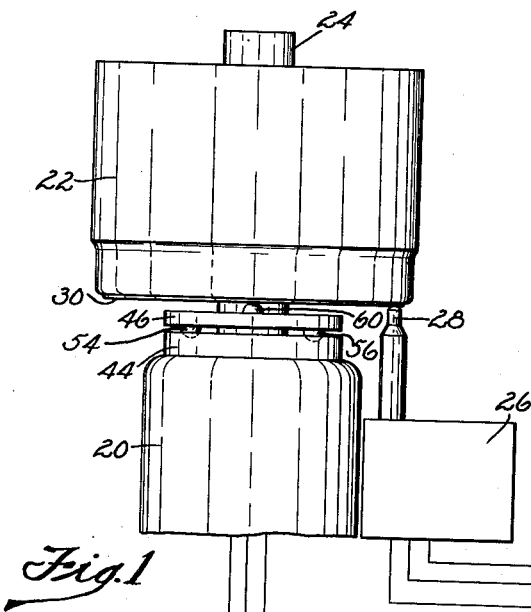
Fig. 1 is a view in elevation showing the work upon the gauge supported by my universal type support.
Figure 3:
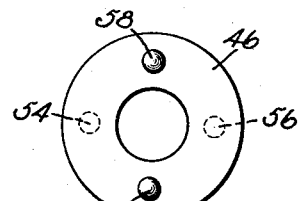
Fig. 3 is a top view of the upper piece of the universal support.
Figure 4:
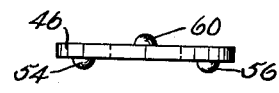
Fig. 4 is a view in elevation of the piece shown in Fig. 3.
Figure 5:
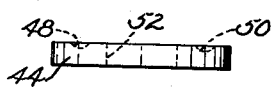
Fig. 5 is a view in elevation of the bottom piece of the universal support.
Figure 2:
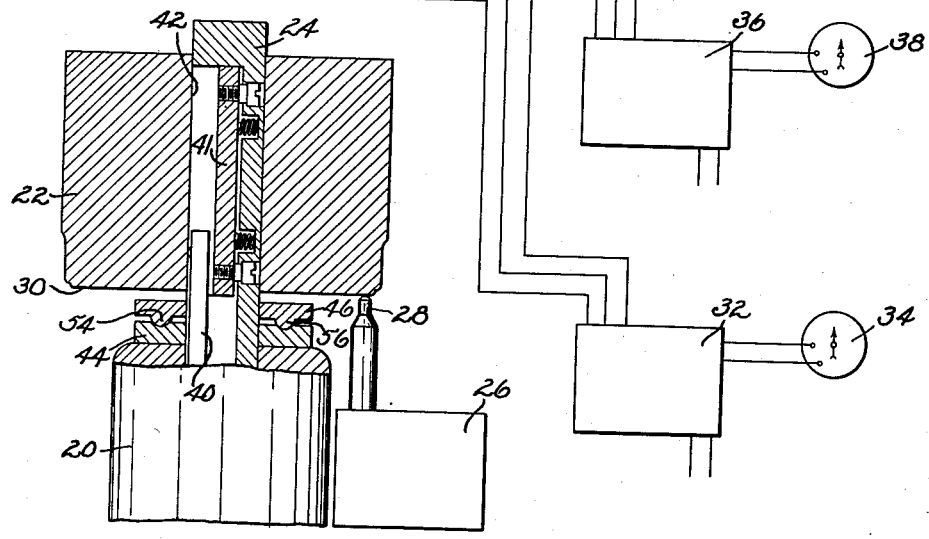
Fig. 2 is a vertical sectional view of Fig. 1.

Referring now to the drawing, there is shown, in Fig. 1, for the purpose of illustrating my invention, an electric gauge 20 such as the one illustrated in Fig. 3 of the Mershon et al., Patent No. 1,928,457. This portion of the gauge is for the purpose of gauging the interior diameter of the bore 42 of the work 22 which is mounted upon the gauge shaft 24. The gauge shaft 24 is provided with a grooved spring pressed shoe 41 which presses against the walls of the bore 42 to adjust the shaft to the size of the bore. A second gauge 26, also of the electric type described in the said patent, has a diamond point gauging member 28 for contacting and gauging the lower finished face 30 of the work 22. Instead of the electric type gauges, other types of sensitive gauges may be used, if desired. The gauge 20 is connected by three electrical conductors to a case 32 containing the elements 10 to 16 inclusive and 19, which are disclosed in Fig. 2 of said patent. This casing 32 is also connected to the power supply and to a direct-current microammeter 34 corresponding to the microammeter 20 of said patent. The electric gauge 26, like the gauge 20, contains the elements 17 and 18 of the electric gauge disclosed in said patent and is connected by three electrical conductors with a casing 36 containing the elements 10 to 16 and 19 of said patent. This casing is also connected to the power supply and to the microammeter 38 which corresponds to the microammeter 20 of said patent.

Heretofore, it has been customary to provide a stop supported by the gauge 20 which is located diametrically opposite the diamond point gauging member 28 and contacts the face 30. The exact position of the stop varied from a point adjacent the shaft to a point as far as the diamond point from the center of the shaft 24, according to individual preference. With this arrangement, the weight of the work 22 upon the stop tended to cock the piece upon the shaft 24, which cocking could be increased or decreased by the manner in which the operator rotated the work 22 upon the shaft 24.

This produced a variation in the readings upon the microammeter 38 which were controlled by the diamond point 28 and it also produced variations in the readings of the microammeter 34, neither of which were due to the variations in the work. The gauge 26 is provided for the purpose of determining the squareness of the face 30 with respect to the bore 42 in the work 22, through which extends the shaft 24. The gauge 20 has a diamond point provided at the end of the lever 40 which contacts the interior of the bore 42 in the work 22 to determine variations in the diameter of the bore 42 through which the shaft 24 extends. The cocking of the work upon the shaft also produces variations in the reading of the microammeter 34 which is controlled by the gauging member 40, as explained in the patent above referred to.

In order to overcome this cocking tendency, I have provided a universal type support which may be of any suitable type; but, for one example, I have shown a type comprising a lower member 44 which rests upon the gauge 20 and an upper member 46 which rests upon the lower member 44 and supports the work 22 by contact with its lower face 30. The lower member 44 is in the form of a circular ring having plane upper and lower surfaces. The upper surface is provided with spherical depressions 48 and 50 located diametrically opposite each other. The bore 52 of the ring 44 receives the shaft 24 to center the spherical depressions 48 and 50.

The upper ring 46 is provided with two spherical projections 54 and 56 extending from its lower face which are received in the spherical depressions 48 and 50. This allows the ring 46 to rock upon these supports about an axis passing through the projections 54 and 56. Exactly 90 degrees from the projections 54 and 56 but on the opposite side of the ring 46 there are provided the hardened projections 58 and 60 which extend directly into contact with the lower face 30 of the work 22. It would be possible to use an upper ring resting upon the projections 58 and 60 in the manner corresponding to the lower ring 44, but I have found that it is possible to eliminate such a ring and to allow the projections 58 and 60 to contact directly the lower face 30 of the work 22. A truly universal type support on the principle of Hooke's joint is provided in either case. This is for the reason that the ring 46 may assume any position within limits about the axis of the projections 54 and 56, which will allow the projections 58 and 60 to move upward or downwardly correspondingly to freely divide equally the weight upon each regardless of any irregularities in the surface 30. The rounded upper faces of the projections 58 and 60 will allow complete freedom of movement of the work thereon about the axis through their projections. In this way, a truly universal support upon the principle of Hooke's joint is provided. However, if desired, universal supports based upon other principles may be used if desired.

By the use of this universal type support, the weight of the work 22 is supported directly upon its center of mass so that there is no tendency to cock the work 22 by reason of its support. All the operator needs to do to obtain excellent results is to so handle the work that a minimum of pressure is applied thereto and, preferably, to use his fingers upon diametrically opposite sides of the work 22 at all times with substantially equal pressure in rotating the work, and very uniform results can thereby be obtained.

While the form of embodiment of the invention as herein disclosed, constitutes a preferred form, it is to be understood that other forms might be adopted, all coming within the scope of the claims which follow.

What is claimed is as follows:

1. In a gauge, a shaft for receiving the work to be gauged, a universal type support concentric with the shaft, said universal support having a movable portion movable with respect to said shaft for supporting the work to be gauged at a fixed position on the shaft, a movable gauging member for contacting a point on the work to be gauged, and indicating means controlled by the gauging member.

2. In a gauge, an upright shaft for receiving the work to be gauged, a universal type support embodying the principle of Hooke's joint serving as a stop to support the work in position upon the shaft, said support being concentric with the shaft and having a plurality of projections located diametrically opposite each other and equidistant from the shaft for contacting the work, a movable gauging member for contacting a point on the work to be gauged, and indicating means controlled by the gauging member.

3. In a gauge, a shaft for receiving an aperture in the work to be gauged, a universal type support concentric with the shaft for supporting the work to be gauged at a fixed position on the shaft, a movable gauging member within the shaft for contacting a point on the walls of said aperture, and indicating means controlled by the gauging member.

4. In a gauge, a shaft for receiving an aperture in the work to be gauged, a universal type support concentric with the shaft, said universal support having a movable portion movable with respect to said shaft for supporting the work to be gauged at a fixed position on the shaft, a movable gauging member for contacting an exterior surface of the work, and indicating means controlled by the gauging member.

EARL R. LEATHERMAN.